United States Patent [19]

Perreault

[11] 4,223,444
[45] Sep. 23, 1980

[54] ACOUSTIC MICROMETER

[76] Inventor: Henri Perreault, 64 rue Albanel, Radisson, Baie James, Quebec, Canada, J0Y 2X0

[21] Appl. No.: 6,733

[22] Filed: Jan. 26, 1979

[51] Int. Cl.³ .......................... G01B 3/18; G01B 5/02
[52] U.S. Cl. .................................... 33/166; 33/164 C; 340/678
[58] Field of Search ............. 33/143 L, 147 N, 164 C, 33/166, 172 E; 116/4; 340/678

[56] References Cited

U.S. PATENT DOCUMENTS

| 1,124,670 | 1/1915 | Sotton | 33/164 C |
| 2,724,185 | 11/1955 | Harr | 33/143 L |
| 3,166,851 | 1/1965 | Shirakura et al. | 33/166 |
| 3,844,047 | 10/1974 | Carson | 33/147 N |

FOREIGN PATENT DOCUMENTS 832837 10/1938 France ..................................... 340/678
21809 of 1902 United Kingdom ..................... 340/678
139848 11/1960 U.S.S.R. .................................... 33/166

Primary Examiner—Richard R. Stearns

[57] ABSTRACT

An acoustic micrometer for measuring the exact distance between two electrically interconnected metallic objects is disclosed. The micrometer comprises a micrometer head having an electrical contact at one end adapted to engage one of the metallic objects when taking a measurement, a housing secured to the other end of the micrometer head and adapted to physically engage the other metallic object, a battery located in the housing, electrical contact means connected to one terminal of the battery and mounted at the end of the housing so as to engage the other metallic object when taking a measurement, and a sound generator and speaker assembly adapted for connection of the micrometer head to emit an audible signal when the electrical circuit is completed between the metallic objects.

4 Claims, 3 Drawing Figures

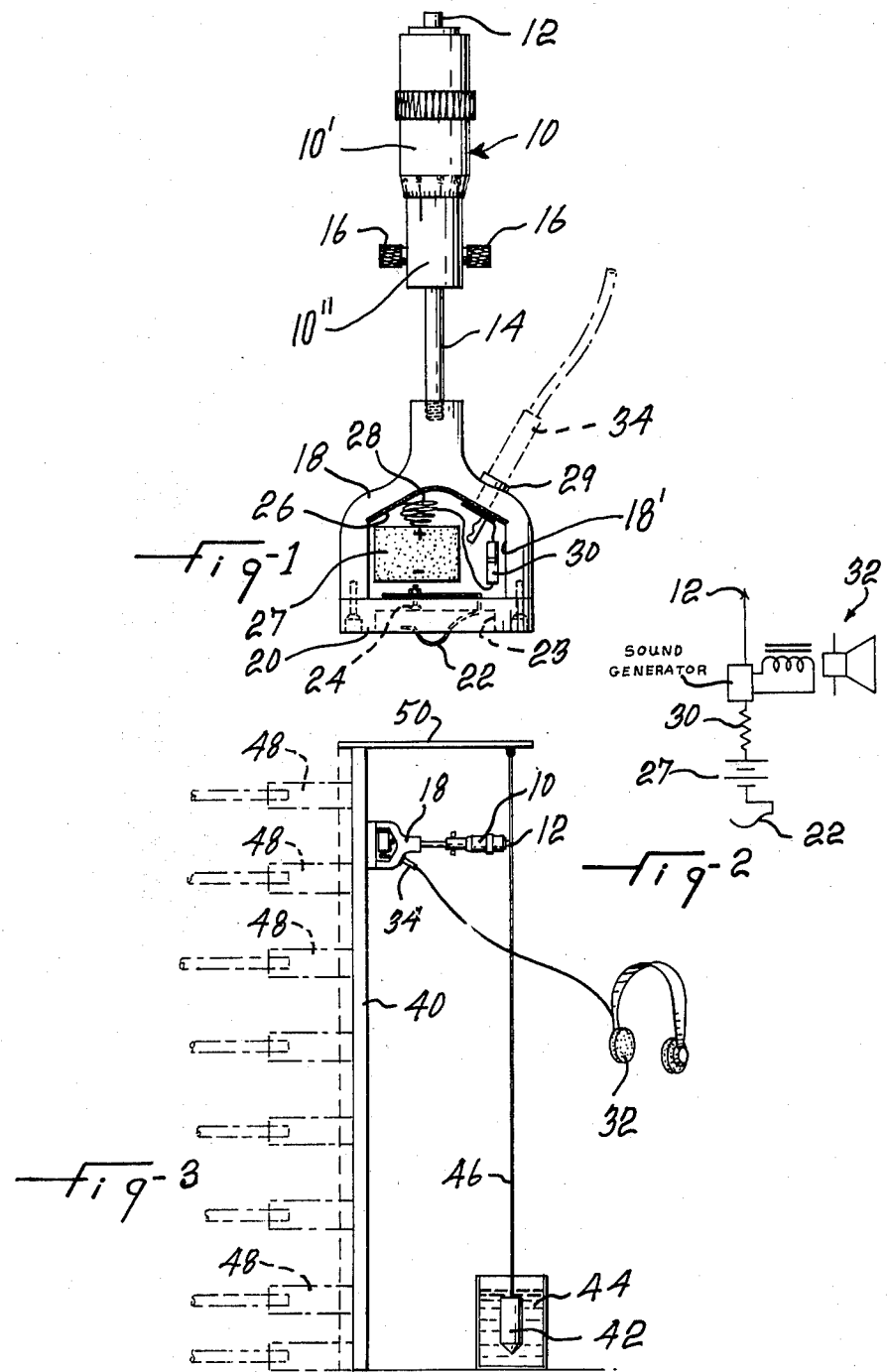

ACOUSTIC MICROMETER

This invention relates to a micrometer for measuring the exact distance between two metallic objects.

BACKGROUND OF THE INVENTION

Micrometers are conventional devices for measuring the exact distance between two objects. In some instances, such as in adjusting structural elements to the vertical, it is common practice to suspend a plumb-bob and to measure the distance between the wire of the plumb-bob and the structural element. However, it is difficult to detect exactly when the micrometer head contacts the wire, so that there is always a slight overshoot and this renders the measurements inaccurate.

SUMMARY OF THE INVENTION

It is therefore the object of the present invention to provide an acoustic micrometer which will permit to detect exactly when the micrometer contact engages the object being measured.

The acoustic micrometer, in accordance with the invention, for measuring the exact distance between two electrically interconnected metallic objects comprises a micrometer head having an electrical contact at one end adapted to engage one of the metallic objects when taking a measurement, a housing secured to the other end of the micrometer head and adapted to physically engage the other metallic object, a battery located in the housing, electrical contact means connected to one terminal of the battery and mounted at the end of the housing so as to engage the other metallic object when taking a measurement, and a sound generator and speaker assembly adapted for connection between the other terminal of the battery and the electrical contacts of the micrometer to emit an audible signal when the electrical circuit is completed between the metallic objects.

An electrical resistance is preferably connected between the other terminal of the battery and the sound generator and speaker assembly to limit the current passing through the assembly.

A jack is preferably mounted on the housing and a plug connected to the sound generator and speaker assembly for removably connecting the assembly between the battery and the electrical contact of the micrometer head.

BRIEF DESCRIPTION OF THE DRAWINGS

The invention will now be disclosed, by way of example, with reference to the accompanying drawings in which:

FIG. 1 illustrates a side view of an acoustic micrometer in accordance with the invention;

FIG. 2 illustrates the electrical circuit of the acoustic micrometer;

FIG. 3 illustrates a specific application of the use of the acoustic micrometer in accordance with the invention.

DESCRIPTION OF A PREFERRED EMBODIMENT

Referring to FIG. 1 of the drawings, there is shown an acoustic conventional inside micrometer comprising a micrometer head 10 including a barrel 10' having a closed outer end to which is secured a measuring metallic contact stud 12. A spindle 10" is telescopically and rotatably inserted through the other open end of barrel 10' and protrudes therefrom. A straight rod 14 is secured by screw 16 to the other end of the spindle 10" which protrudes from barrel 10'. A housing 18 made of electrically conductive material, is secured to the other end of the rod 14. The latter is coaxial with stud 12. The housing 18 has a cavity 18' opening at its outer end and said cavity is closed by a base plate 20 of insulating material such as plexiglass. Base plate 20 has an outer flat surface which is perpendicular to the common axis of stud 12 and rod 14. A blade contact 22 is mounted within a cavity 23 opening at the outer flat surface of plate 20 and secured to the plate by screw 24. In its free standing position, blade contact 22 protrudes from the outer flat surface of base plate 20. The bottom of the cavity 18' in the housing is lined with insulating material 26 and a battery 27 is located in the cavity between a spring-type contact 28 and a fixed contact which, in this embodiment, is screw 24 used to secure the blade contact 22 to the base plate 20. An electrical jack 29 is mounted on the housing and has one terminal connected to the housing and its other terminal insulated from the housing in known manner and connected to the spring contact 28 of the battery through a resistor 30. A sound generator and speaker assembly, in the form of an earphone 32 or an ear plug is connected to the jack 29 by means of plug 34.

FIG. 2 of the drawings shows the electrical circuit comprising the blade contact 22, the battery 27, the sound generator and speaker (earphone 32) and the micrometer head contact 12. It will be easily understood from the electrical circuit that the continuity of the circuit is made through the housing 18 and the micrometer head 10 which, in this embodiment, are made of metal. The housing and/or micrometer head could be made of non-electrically conducting material provided that an electrical conductor is interconnected between the jack 29 and the contact stud 12 of the micrometer head.

FIG. 3 illustrates one application of the acoustic micrometer in accordance with the invention wherein the micrometer is used to adjust a metallic plate 40 so as to be exactly vertical. A plumb-bob 42 located in a pail of damping liquid 44 is suspended by a wire 46. Wire 46 is thus a reference which is placed at a predetermined distance from the top of the plate 40. Said distance is measured at various heights and the position of the plate adjusted such as to be exactly parallel to the wire by means of anchors 48. In making each measurement, the micrometer is positioned such that its base plate 20 rests against the vertical plate 40 and the micrometer head is rotated slowly until the contact stud 12 touches the wire 46. When the base plate 20 of the micrometer is placed in contact with the metal plate 40, the contact blade 22 is in engagement with the plate 40 and the circuitry from base plate 40 to the wire 45 completed through a metal plate 50 or any other suitable means for electrically interconnecting plate 40 to wire 46. Closure of the electrical circuit at contact stud 12 will emit a noticeable sound in the earphone as soon as the micrometer head contact stud 12 engages the wire 46 and there will be no substantial overshoot in making the measurement. Thus, the measurement will be very accurate. In the measuring position of the hand-held acoustic micrometer, the outer flat surface of base plate 20 rests against the flat surface of plate 40, thereby maintaining the micrometer head 10 perpendicular to plate 40 for accurate measurement. Blade contact 22 is biased against plate 40 to make good electrical contact therewith.

Although the invention has been disclosed with reference to a preferred embodiment, it is to be understood that it is not limited to such embodiment and that other alternatives are also envisaged. For example, the jack and plug connection is not absolutely necessary and the earphone could be connected directly to the battery. However, this arrangement is more desirable since, when the sound detector is not connected, it is not possible to accidentally close the electrical circuit and drain the battery.

What I claim is:

1. A hand-held acoustic micrometer of the inside type for measuring the exact distance between two electrically-interconnected metallic objects, at least one of which is a flat surface, comprising:
   (a) a micrometer head comprising a barrel having a closed outer end and a spindle telescopically and rotatably inserted through the other end of said barrel and protruding from said other end of said barrel, a stud protruding from said closed outer end of said barrel and forming an electrical contact adapted to engage the other one of said metallic objects when taking a measurement; a straight rod secured at one end to the protruding portion of said spindle and axially aligned with said stud;
   (b) a housing secured to the other end of said rod at its inner end and having a cavity opening at the outer end of said housing, a base plate secured to the outer end of said housing and closing said cavity of said housing, said base plate forming an outer flat surface perpendicular to the common axis of said stud end of said rod and adapted to physically engage said flat surface of said one metallic object, so as to maintain said axis perpendicular to said last-named flat surface, said base plate made of electric insulating material and having a cavity opening at its outer flat surface;
   (c) a battery located in said housing cavity;
   (d) a resilient electrical contact blade connected to one terminal of said battery and mounted within said cavity of said base plate and biased to take a free standing position in which it protrudes from said outer flat surface of said base plate, so as to bend inwardly and make good electrical contact with said one metallic object when said base plate physically engages said flat surface of said one metallic object; and
   (e) a sound generator and speaker assembly removably connected between the other terminal of said battery and said stud and emitting a sound when the electrical circuit is completed between the metallic objects through said stud and through said contact blade.

2. An acoustic micrometer as defined in claim 1, further comprising an electrical resistance located in said housing and connected between said other terminal of the battery and said sound generator and speaker assembly to limit the current passing through said assembly.

3. An acoustic micrometer as defined in claim 1, further comprising a jack mounted on said housing and a plug removably insertable into said jack and connected to said assembly for removably connecting said assembly between said other terminal of the battery and the stud of the micrometer head.

4. An acoustic micrometer as defined in claim 3, wherein the housing and micrometer head and rod are made of metallic material and said jack has one terminal connected to said housing, and the other terminal connected to said other terminal of said battery.

* * * * *